DEVICE FOR SYNCHRONIZING A RECEIVER TO THE TRANSMITTER IN A TIME DIVISION MULTIPLEX SIGNALLING SYSTEM AND CONVERTING TIME POSITION MODULATED PULSE TRAINS INTO AMPLITUDE MODULATED PULSE TRAINS

Filed June 9, 1952 2 Sheets-Sheet 1

Inventors
L. B. Person
C. H. Von Sivers
R. K. Wadö
K. R. Wickman
By Glascock Downing Seebold Attys.

DEVICE FOR SYNCHRONIZING A RECEIVER TO THE TRANSMITTER IN A TIME DIVISION MULTIPLEX SIGNALLING SYSTEM AND CONVERTING TIME POSITION MODULATED PULSE TRAINS INTO AMPLITUDE MODULATED PULSE TRAINS

Filed June 9, 1952 2 Sheets-Sheet 2

Inventors
L. B. Person
C. H. Von Sivers
R. K. Wadö
K. R. Wickman
By Glascock Downing & Seebold
Attys United States Patent Office 2,717,277

Patented Sept. 6, 1955

2,717,277

DEVICE FOR SYNCHRONIZING A RECEIVER TO THE TRANSMITTER IN A TIME DIVISION MULTIPLEX SIGNALLING SYSTEM AND CONVERTING TIME POSITION MODULATED PULSE TRAINS INTO AMPLITUDE MODULATED PULSE TRAINS

Lars Bernhard Person and Carl Henric Von Sivers, Stockholm, and Reid Kurt Wadö and Klas Rudolf Wickman, Hagersten, Sweden, assignors to Telefonaktiebolaget L. M. Ericsson, Stockholm, Sweden, a company of Sweden Application June 9, 1952, Serial No. 292,566

Claims priority, application Sweden June 12, 1951

3 Claims. (Cl. 179—15.6)

Figure 1:
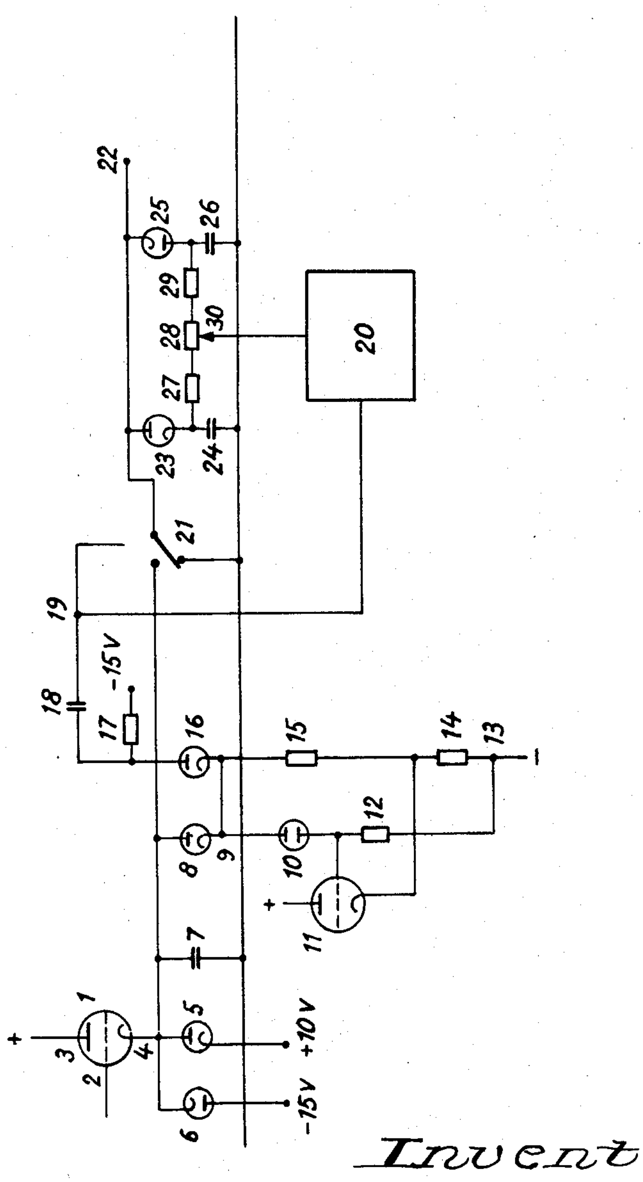

This invention relates to time division multiplex signalling systems, i. e. systems in which the message of each channel is transmitted by a pulse train belonging to this channel, and the pulse trains of the different channels are interlapping in time.

The channel pulses transmit their respective messages by being modulated e. g. in amplitude, duration or time position. Contrary to the channel pulses the synchronizing pulses are usually not modulated. In order to be able to be separated from the channel pulses the synchronizing pulses therefore usually have another shape than these, e. g. another amplitude or duration or they may consist of two or more closely adjacent pulses with an accurately determined interval between them.

In the Swiss Patent No. 273,565 a method for synchronizing has previously been described, said method comprising a combination of a time position modulation of the synchronizing pulse train at the transmitter end by a modulation frequency being a submultiple to the repetition frequency of the synchronizing pulses, and at the receiver end a filtering out of said modulation frequency by a selective circuit, after the demodulation of the time position modulated pulse trains, said circuit being tuned to said modulation frequency.

This invention relates to a device for synchronizing a receiver to the transmitter in a time division multiplex signalling system, in which the pulses of each channel are time position modulated, and in which synchronizing pulses having the same repetition frequency as that one of the pulses of a single channel are time position modulated to the time displacement, which is the maximum allowed displacement of the pulses of each channel, by a synchronizing channel modulation frequency, which is a submultiple of the repetition frequency of the synchronizing pulses, and converting said time position modulated pulses into amplitude modulated pulses.

The invention is characterized by a condenser intended to be charged by the time position modulated pulses to a certain, determined, positive voltage +10 volts, which is equal for all pulses, said condenser being connected between ground and a point, to which point a constant-current discharge device is connected, said discharge device being intended to discharge said condenser by a constant current during the time between the pulses to an equal voltage but of negative sign −10 volts as the positive voltage +10 volts previously mentioned, to which the condenser has been charged by each pulse, during a time corresponding to the maximum allowed time displacement, and to a greater but limited negative voltage −15 volts, if the discharge is allowed to continue during a longer time, and a pulse generator arranged to deliver a pulse train, the repetition frequency of said train being equal to the number of channels multiplied by the repetition frequency of a single channel, said pulse generator being arranged to control an electron switch in such a manner as to cause the not grounded end of the condenser to be connected to an output terminal during the times, when pulses from said pulse generator exist, resulting in amplitude modulated pulse trains being obtained between said output terminal and ground, the amplitudes of the pulses of said pulse train varying according to the time positions of corresponding time position modulated pulses in such a manner that the amplitudes will vary between a maximum corresponding to the positive voltage +10 volts, to which said condenser has been charged, and by synchronism and the right time position between the pulse train from the pulse generator and the time position modulated pulse train to the same voltage but of negative sign −10 volts, but, when there is not synchronism, or the time position is wrong, to another negative voltage, and an amplitude comparating device connected to said output terminal and arranged to deliver partly a positive voltage by peak detection said voltage corresponding to the maximum positive amplitude of the pulses of said amplitude modulated pulse train, partly a negative voltage corresponding to the maximum negative amplitude of the pulses of said amplitude modulated pulse train, said amplitude comparating device being arranged to deliver the difference between these two voltages as a regulation voltage, which will be positive, when the maximum negative pulses of the amplitude modulated pulse train has less amplitude than the maximum positive pulses of said amplitude modulated pulse train, corresponding to the pulse train generated by the pulse generator having too high a repetition frequency or the pulses of said pulse train occurring too early, and which regulation voltage will be negative, when the maximum negative pulses of the amplitude modulated pulse train have greater amplitude than the maximum positive pulses of said amplitude modulated pulse train, corresponding to the pulse train generated by the pulse generator having too low a repetition frequency or the pulses of said pulse train occurring too late, said regulation voltage being arranged to regulate the repetition frequency and the time position of the pulse train delivered by said pulse generator to be the same as the repetition frequency and the time position of the time position modulated initial pulse train.

The invention makes possible partly a very simple device having few electron tubes for accurately synchronizing a receiver to a transmitter and partly a converting of time position modulated pulses to amplitude modulated pulses causing very little distortion to be introduced.

Figure 2:
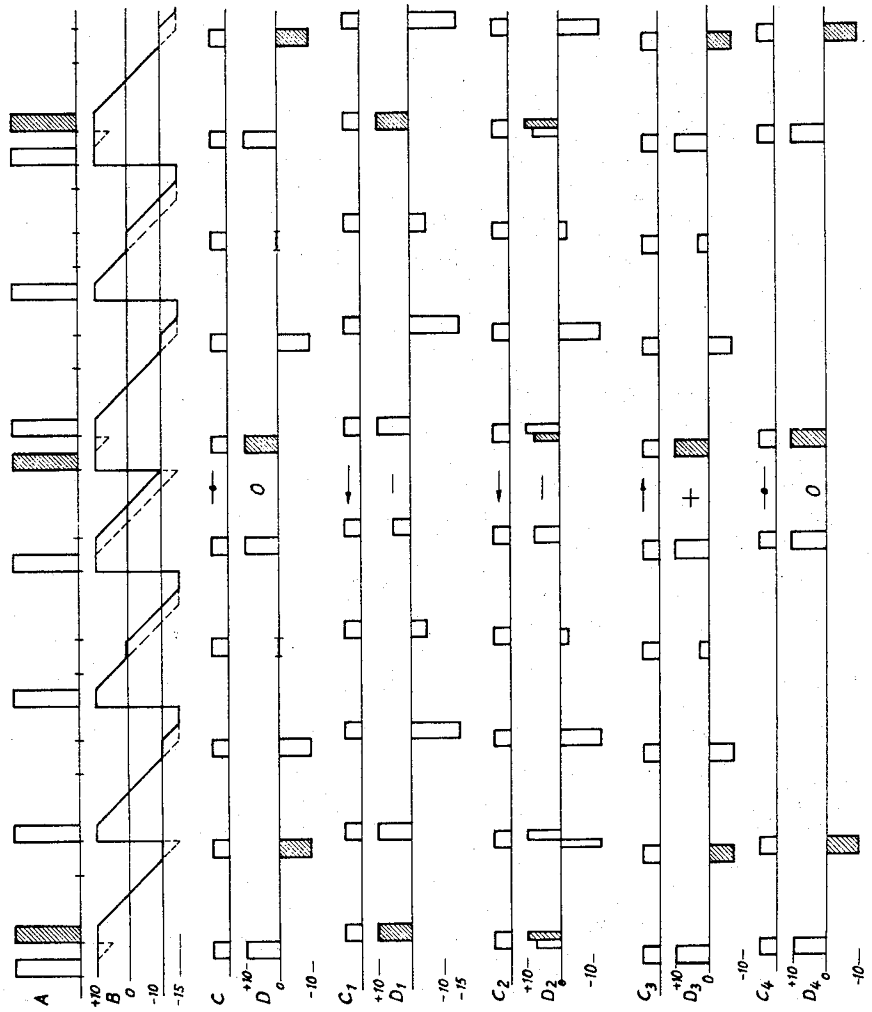

The invention will be closer described in connection with the accompanying drawing, wherein Fig. 1 shows a device according to the invention and Fig. 2 shows a waveform diagram in connection with said device.

Fig. 1 shows a device according to the invention, wherein a received multichannel pulse train, comprising both time position modulated channel pulses and synchronizing pulses, which are time position modulated by half the repetition frequency, is converted into an amplitude modulated pulse train, at the same time as a good synchronizing of a local pulse generator is obtained.

In the figure 1 indicates an electron tube with its control grid 2, anode 3 and cathode 4. The anode is connected to a positive voltage, while the cathode is connected partly through a diode 5 to a positive voltage of e. g. +10 volts, partly through a diode 6 to a negative voltage of e. g. −15 volts. The diodes are directed in such a manner that none of them will be conducting when the potential of the cathode of the tube 1 is between +10 and −15 volts. The cathode 4 of the tube 1 is further connected to ground through a condenser 7. To point 4 (the cathode) there is further connected a device of known construction for the discharge of the condenser 7 with a constant current. This device comprises a diode 8 connected with its anode to point 4 and its cathode to point 9, which via a glow lamp 10 is connected to the grid of a tube 11. The grid leak 12 of this tube is connected to a point 13, which has a certain negative voltage, to which point the cathode resistor 14 of the tube is also connected. The cathode of the tube is further connected to point 9 through a resistor 15. To point 9 the cathode of a diode 16 is connected, while the anode of this diode is connected to a negative voltage of e. g. −15 volts through a resistor 17. The anode of the diode 16 is further connected to a point 19 through a condenser 18, to which point positive pulses are obtained from a local pulse generator 20. The repetition frequency of the pulses is equal to $n \cdot f$, where $n$ is the number of channels inclusive the synchronizing channel, and $f$ is the repetition frequency of the pulse train of a single channel. 21 is an electronic switch of known construction, which switch normally connects point 22 to ground, but which will connect point 22 to point 4, when a positive pulse from the pulse generator 20 is applied to point 19. Said electronic switch will thus be actuated by the pulses from the pulse generator 20. To point 22 there is connected the anode of a diode 23, the cathode of which is connected to ground through a condenser 24. To point 22 there is further connected the cathode of another diode 25, the anode of which is connected to ground through a condenser 26. The cathode of the diode 23 is connected to the anode of the diode 25 through three series connected resistors 27, 28 and 29, of which 28 is a potentiometer, the movable contact 30 of which is connected to the local pulse generator 20.

The device functions in the following manner. The pulse position modulated multichannel pulse train is applied to the control grid 2 of the tube 1 as a train of positive pulses. See Fig. 2A. The tube 1, which normally is cut off, will be conducting, when a positive pulse is applied to the grid. The condenser 7 will then be charged to +10 volts, and can not get a more positive voltage, because the diode 5 will be conducting at said voltage. When the pulse has disappeared, the tube 1 will be cut off again, and the condenser 7 will be discharged by the previously mentioned constant-current-discharge-device, which device comprises the diode 8, the glow lamp 10, the tube 11 and the resistors 12, 14 and 15. That device, which is previously known, functions in the following manner. When the condenser 7 is discharged, the voltage of the point 9 will decrease causing the current through the resistors 14 and 15, which current normally would decrease, to be maintained at a constant value by the voltage drop of the point 9 making the control grid of the tube 11 more negative through the glow lamp 10. The current through the tube 11 and the resistor 14 will thereby decrease, causing the voltage drop over the resistor 14 also to decrease. By a suitable dimensioning of the resistance of this resistor one may obtain a constant voltage drop over the resistor 15 causing a constant discharge current to be obtained for the discharge of the condenser 7 through the diode 8 and the resistors 15 and 14. The time constant of the discharge is chosen so that the discharge will go from the positive limiting value of the diode 5 (+10 volts) to the same value but of negative sign (−10 volts) in a time corresponding to whole the modulation displacement of a time position modulated channel pulse train. When a positive pulse is obtained from the pulse generator 20, see Fig. 2C, the pulse will pass the diode 16 and increase the potential of the cathode of the diode 8 to such a high value, that the discharge of the condenser 7 will be prevented during the time the pulse exists. When the pulse has disappeared, the discharge of the condenser 7 will go on to the negative limiting value of the diode 6 (−15 volts). See Fig. 2B. The positive pulse from the pulse generator 20, which pulse is applied to 19, will switch on the switch 21, which connects point 22 to ground when no pulse from said pulse generator exists, causing point 22 to be connected to point 4 during the time the pulse exists. The pulse transmitted by 21 to point 22, see Fig. 2D, will therefore get a constant amplitude as long as the pulse exists in point 19, and otherwise its amplitude will be zero. The amplitude of the pulse in point 22 may be positive, zero or negative, in dependence of how much the condenser 7 has been discharged, when the switch 21 is switched on.

The pulse train according to Fig. 2D and obtained in point 22 will thus be an amplitude modulated pulse train modulated in accordance with the time position modulated pulse train, Fig. 2A, which pulse train is applied to point 2, and may be sent further or be demodulated by known devices.

The amplitude comparating device, which comprises the components 23—30, will peak detect partly the maximum positive pulses and partly the maximum negative pulses of the amplitude modulated pulse train in point 22. In point 30 there is thus obtained a regulation voltage for the pulse generator 20, which regulation voltage, if being negative, will increase the frequency of the pulse generator, and, if being positive, will decrease said frequency. The oscillator 20 is thus caused to be synchronized to the time position modulated pulse train, which is applied to the control grid 2 of the tube 1, resulting in a pulse of the amplitude modulated pulse train getting maximum positive amplitude, when the corresponding synchronizing pulse of the initial time position modulated pulse train has its latest position, and getting maximum negative amplitude, when the corresponding synchronizing pulse has its earliest position. By the help of the potentiometer 28 or a corresponding device of the frequency regulating device of the pulse generator 20 these amplitudes may be made equal. The amplitudes of the channel pulses have values between these extreme values depending upon their momentary amplitudes.

The device according to the invention thus demands, that the multichannel time position modulated pulse train shall comprise partly pulses having the earliest possible time position in the allowed modulation displacement interval and partly pulses having the latest possible time position in said interval. Because the channel pulses seldom are fully modulated, so that this condition would be fulfilled by them, it is required to have a special channel pulse train, the synchronizing pulse train, which is brought to fulfill said condition. This is obtained most simply by the synchronizing pulse train being time position modulated to full displacement by a modulation frequency, which has a certain relation to the repetition frequency of a single channel pulse train, e. g. being a submultiple to said repetition frequency. If the modulation frequency of the synchronizing pulses is chosen equal to half the repetition frequency of a single channel pulse train, one will obtain the result of the synchronizing pulses every other time having their earliest possible time position and every other time their latest possible time position in the allowed time displacement modulation interval, the condition previously mentioned thus being fulfilled.

In Fig. $2C_1$, $C_2$ and $C_3$ there are shown three cases, when the pulses in point 19 do not have their time positions. In Fig. $2C_1$ the pulses from the local pulse generator 20 arrive too late, in Fig. $2C_2$ not quite so late and in Fig. $2C_3$ the pulses arrive too early. Fig. $2D_1$, $D_2$ and $D_3$ show the corresponding resulting amplitude modulated pulse trains. As is shown by Fig. $2D_1$ the maximum negative amplitudes are greater than the maximum positive amplitudes. Thus in point 30 in Fig. 1 there is obtained a regulation voltage of negative polarity, which, as has previously been mentioned, will cause the frequency of the pulse generator 20 to increase, i. e. the pulses in Fig. $2C_1$ are brought to arrive earlier. The same is true in Fig. $2C_2D_2$, though the regulation voltage will not be quite as large there. Fig. $2D_3$ shows a case in which the maximum positive amplitudes are greater than the maximum negative amplitudes. In this case there is obtained in point 30 in Fig. 1 a regulation voltage of positive polarity, which as has previously been mentioned, will cause the frequency of the pulse generator 20 to decrease, i. e. the pulses in Fig. $2C_3$ are brought to arrive later.

A closer examination of the waveforms in the figures will show that the pulse train obtained in point 19 from the pulse generator 20 does not need to comprise all the pulses corresponding to all the channel pulses, but that it may be enough with pulses corresponding to partly the synchronizing pulses, partly the pulse train corresponding to the channel pulse train, which arrives immediately before the pulses of the pulse train in point 19 in Fig. 1 corresponding to the synchronizing pulse train. See Fig. $2C_4$ and $2D_4$. Other pulses, which are wanted, may of course also be included in the pulse train in point 19 in Fig. 1. This case may be used at relay stations, where it is wanted to transmit a number of channels in another direction than the main direction. By the help of the pulse train according to Fig. $2C_4$ it may be possible to separate a number of channels in a known manner, e. g. by lengthening the pulses in Fig. $2C_4$, so that their duration will be equal to the maximum allowed displacement of the time position modulated pulses according to Fig. 2A, and a multiplicative mixing of said lengthened pulses to the pulses according to Fig. 2A, causing a selection of only the time position modulated pulses, which occur at the same time as said lengthened pulses. Another method of channel separating is the following: To point 19 there are only applied the pulses from the pulse generator 20, which correspond to the channel pulses, which are wanted to be separated, i. e. in Fig. $2C_4D_4$ only the synchronizing pulses belonging to the last channel. In point 22 there are thus obtained only the amplitude modulated pulses belonging to said last channel and the synchronizing channel. These channels may thus be separated and sent away in a wanted direction as amplitude modulated pulses. These may of course also be converted into time position modulated pulses before being transmitted.

As to the durations of the pulses the sum of the duration of a time position modulated pulse and the duration of a pulse of the pulse train in 19 in Fig. 1 ought to be less than the safeguard interval of the time position modulated pulse train, these durations measured at the base line. The two pulse durations may suitably be made equal.

For demodulation of the amplitude modulated pulse train obtained in point 22 it is required for the selection of the right channel pulses e. g. to have a sinusoidal voltage, which is synchronized with the repetition frequency of a single channel of the time position modulated pulse train. In the device described above one may simply filter out the voltage of half the repetition frequency representing the modulation of the synchronizing pulses for this purpose. Said voltage may be filtered out from the pulse train in point 4 or still better from the pulse train in point 22.

We claim:

1. A device for synchronizing a receiver to the transmitter in a time division multiplex signalling system, said system being of the type in which each of the pulses in each channel is time-position modulated, and in which synchronizing pulses, having the same repetition frequency as that of the pulses of a single channel, are time-position modulated to a time displacement which is the maximum allowed displacement of the pulses of each single channel, by a synchronizing channel modulation frequency which is a submultiple of the repetition frequency of the synchronizing pulses, and for converting said time-position modulated pulses into amplitude modulated pulses, said device comprising: an input circuit, a condenser connected to said circuit to be charged by the time-position modulated pulses to a fixed, predetermined positive voltage which is equal for all pulses, a constant-current discharge device connected to said condenser to discharge the same by a constant current, during the time between pulses, to a negative voltage equal to the said positive voltage in magnitude during a time corresponding to the maximum allowed time displacement of said pulses, and to a greater but limited voltage of negative sign if the discharge continues for a longer time, a pulse generator arranged to deliver a pulse train whose repetition frequency is equal to the product of the number of channels by the repetition frequency of a single channel, an output terminal, an electronic switch, said pulse generator being connected to control said electronic switch to connect said condenser to said output terminal during the times when said generator is emitting pulses, to provide amplitude modulated pulse trains at said output terminal, the amplitudes of the pulses of said pulse train varying according to the time positions of corresponding time-position modulated pulses, a peak detecting amplitude comparing device connected to said output terminal and arranged to deliver a regulation voltage corresponding to the difference between the maximum positive and negative amplitudes of said train pulses, and means for applying said regulation voltage to said generator to control the repetition frequency and the time position of the train pulses delivered by said generator so that they are equal to the repetition rate and the time position of the time-position modulated pulses arriving at said input circuit.

2. A device in accordance with claim 1, in which is included means controlled by said pulse generator for disconnecting said constant current discharge device from said condenser during the existence of pulses from said generator, and thereby to prevent discharge of said condenser during such periods.

3. A device in accordance with claim 1, including means for controlling said pulse generator to deliver pulses corresponding to pulses in selected input channels only, whereby only pulses in said channels are converted into amplitude modulated pulses.

No references cited.